United States Patent [19]
Nash

[11] 3,793,838
[45] Feb. 26, 1974

[54] AUGMENTER FUEL INJECTION MOUNTING SYSTEM

[75] Inventor: Dudley O. Nash, Forest Park, Ohio

[73] Assignee: General Electric Company, Cincinnati, Ohio

[22] Filed: Sept. 5, 1972

[21] Appl. No.: 286,434

[52] U.S. Cl............... 60/261, 60/39.32, 60/39.74 R
[51] Int. Cl............................ F02c 3/04, F02c 7/22
[58] Field of Search............ 60/39.74 R, 261, 39.32; 287/23; 285/158; 277/187; 248/56

[56] References Cited
UNITED STATES PATENTS

| | | | |
|---|---|---|---|
| 3,147,594 | 9/1964 | Hill et al. | 60/39.74 R |
| 2,978,870 | 4/1961 | Vdoviak | 60/39.74 R |
| 2,523,741 | 9/1950 | Weschler et al. | 248/56 |
| 3,565,445 | 2/1971 | Hodges | 277/187 X |
| 3,514,954 | 6/1970 | Colley | 60/261 |
| 3,335,567 | 8/1967 | Hemsworth | 60/39.74 |
| 3,698,186 | 10/1972 | Beane et al. | 60/261 X |
| 3,181,297 | 5/1965 | Belk et al. | 60/39.74 X |
| 3,572,733 | 3/1971 | Howald et al. | 285/158 X |
| 2,969,925 | 1/1961 | Burgess et al. | 60/39.74 R |

Primary Examiner—Carlton R. Croyle
Assistant Examiner—Robert E. Garrett
Attorney, Agent, or Firm—Thomas J. Bird, Jr.; Derek P. Lawrence

[57] ABSTRACT

An augmenter fuel distribution system for a gas turbine engine includes a fuel manifold assembly mounted externally of the engine casing, a plurality of fuel injection spraybar bundles, a metering valve housing associated with one or more of the spraybar bundles, each housing including a mounting pad for mounting the housing and spraybar bundle directly to the fuel manifold assembly, thereby supporting the bundle in the radial direction, a seal and damper assembly which mounts to the casing and supports the bundle in the axial direction while permitting relative thermal expansion between the bundle and the casing.

15 Claims, 11 Drawing Figures

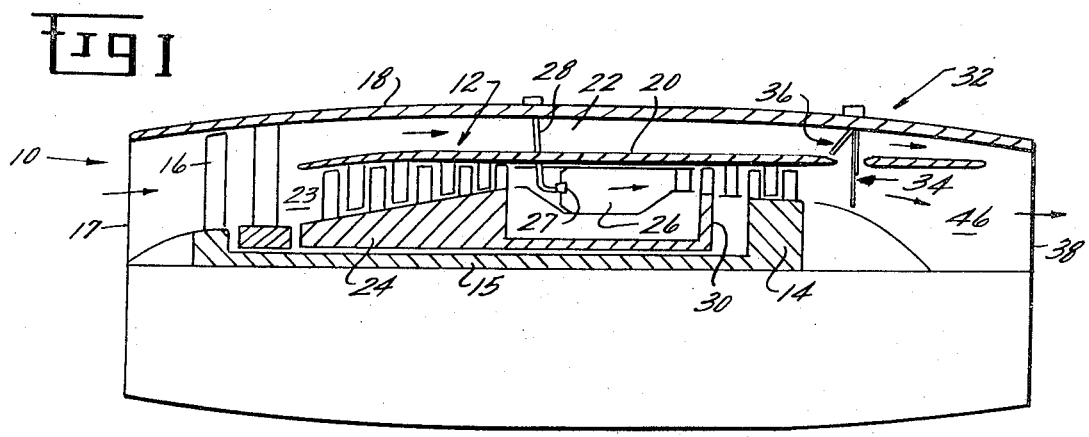
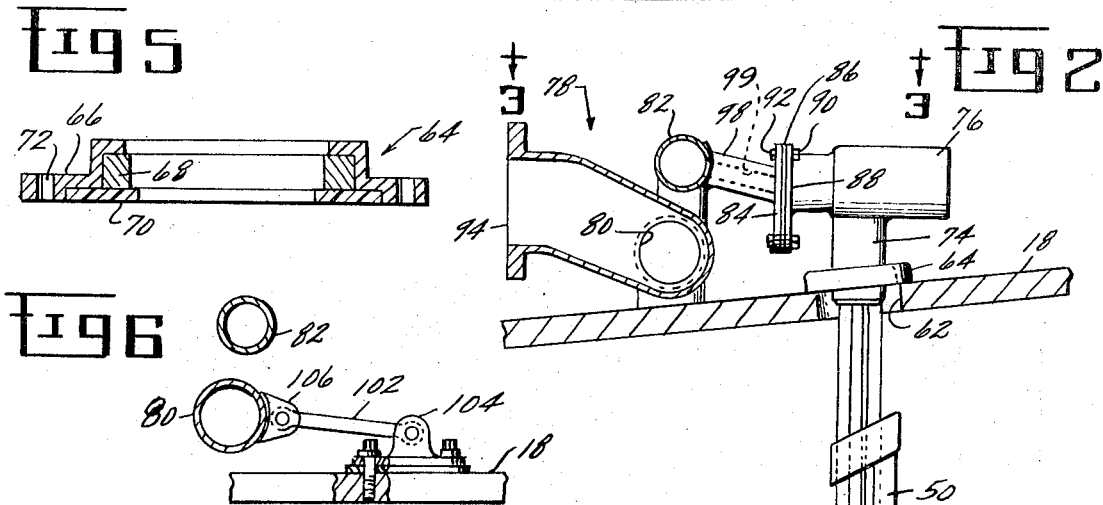
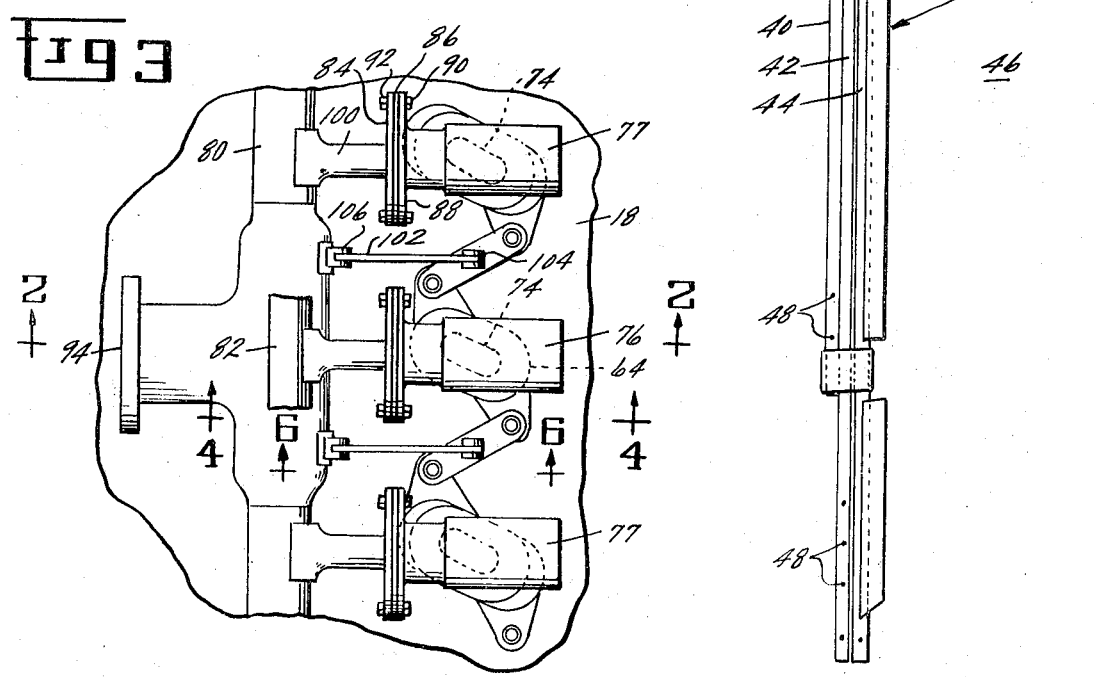

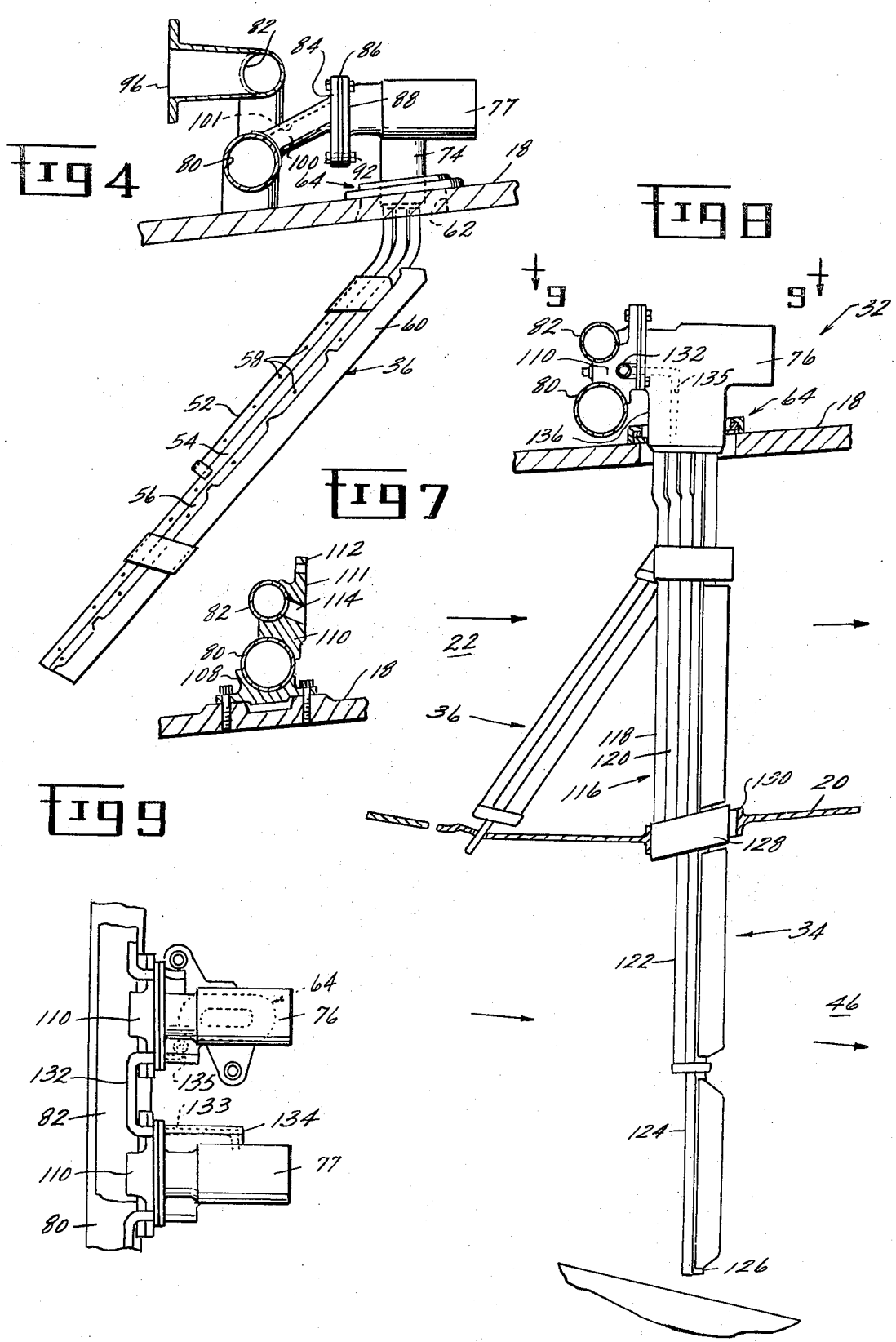

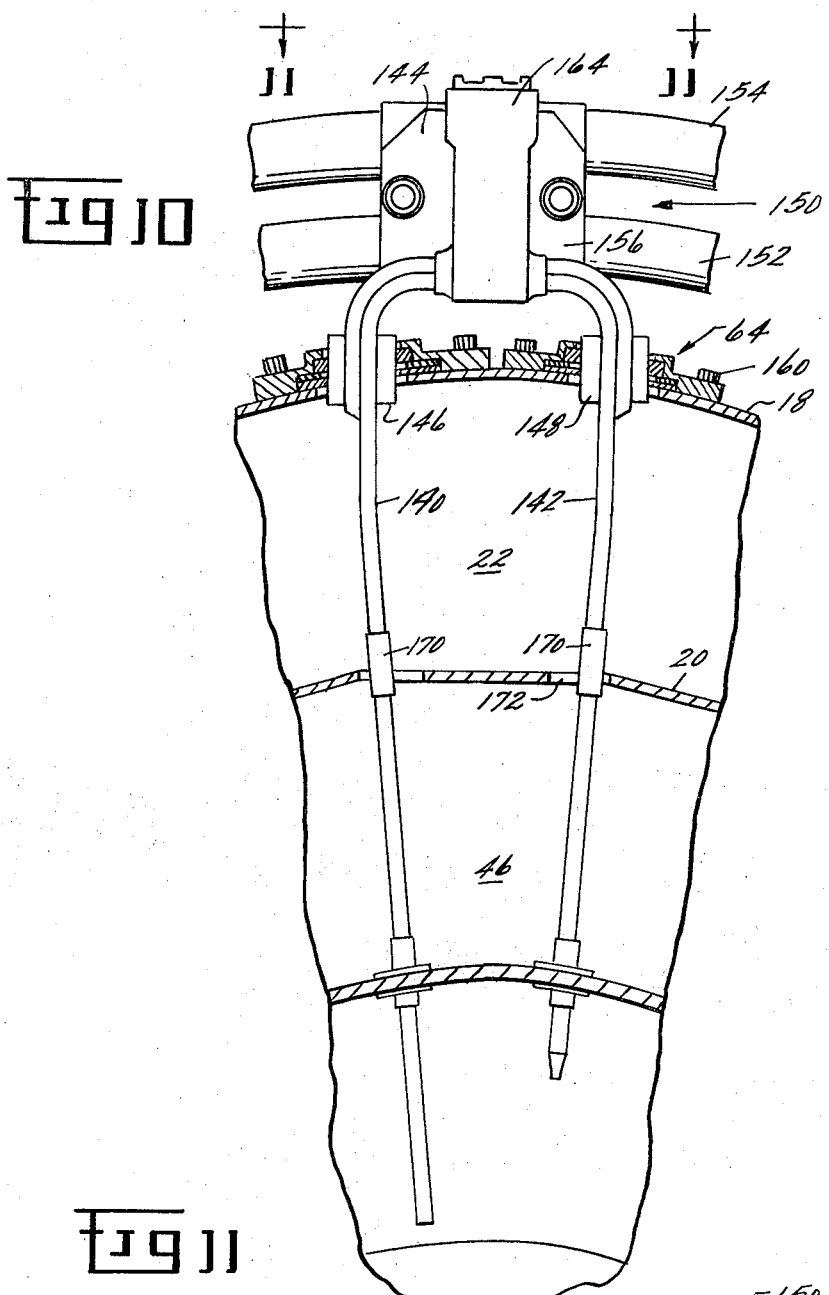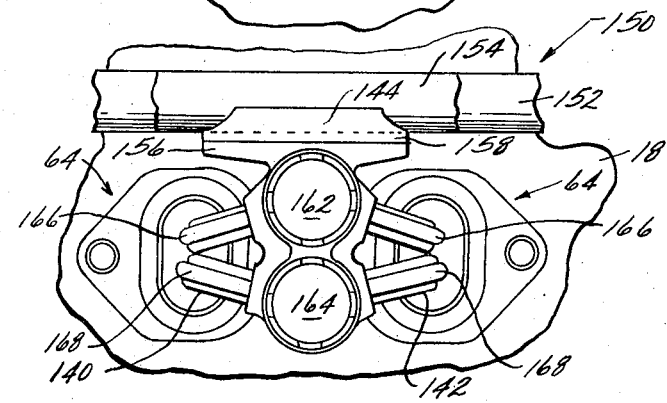

3,793,838

AUGMENTER FUEL INJECTION MOUNTING SYSTEM

BACKGROUND OF THE INVENTION

This invention relates primarily to improvements in fuel delivery systems for gas turbine engine augmenters and, in particular, to an improved fuel injection spraybar assembly and mounting system.

The invention herein described was made in the course of or under a contract, or a subcontract thereunder, with the United States Department of the Air Force.

The present invention may be best understood by referring to its motivating environment, namely, gas turbine engines which are widely used in the propulsion of aircraft. Such engines basically comprise an axial flow compressor which compresses air for combustion with fuel in an annular combustor. The products of combustion initially drive a turbine that powers the axial flow compressor and are then directed through a discharge nozzle to obtain a propulsive jet force. In certain applications, additional fuel is injected into the discharge nozzle by means of an augmenter or afterburner system. In these cases, the additional fuel is ignited within the engine exhaust duct and is discharged through the nozzle to provide additional propulsive force.

In all such augmented engines, the amount of fuel delivered by the augmenter fuel system must be closely controlled in order to achieve high performance in the augmenter system. Likewise, it is important that the fuel be uniformly introduced around the circumference of the engine in order that substantially uniform combustion exists in the augmenter. Previous attempts at providing uniform and accurately controlled fuel injection have resulted in the use of injector metering valves which are associated with each fuel injector point. In addition, the number of fuel injection points has been continually increasing in order to provide uniform combustion throughout the augmenter. On recent engines as many as sixty injection stations or points have been utilized with as many as one hundred metering valves associated with the injection points. These metering valves, of necessity, add both cost and weight to the augmenter assembly and, therefore, a means is needed to achieve high performance fuel distribution without excessive metering valve weight and cost penalties.

Many present day engines are of the turbofan type in which a fan is positioned within the inlet of the engine and is driven by a fan turbine which forms part of a core engine. The airflow entering the inlet is pressurized by rotation of the fan and is then split into a core engine flow path and a bypass or fan flow path which surrounds the core engine flow path. Complications occur when an augmenter system is added to such a turbofan engine, especially when augmentation is desired in both the core engine flow path and the fan flow path. In many such applications, fuel is introduced separately to the fan air stream and to the core air stream and, therefore, separate controls are needed for providing the desired fuel to both the fan air stream and the core air stream. Any practical augmenter fuel injection mounting system must, therefore, be adaptable for use in systems wherein separately controlled augmenter fuel is provided to the fan and core engine flow paths.

Common practice in the industry in the past has been to provide flexible tubes (pigtails) between each fuel injector point and a fuel manifold which surrounds the engine casing. These pigtails are provided to substantially reduce thermal and vibratory stresses in the high pressure tubing during operation of the engine. Unfortunately, while successful in reducing thermal and vibratory stresses, the pigtails also add unnecessary weight and increase the overall size or envelope of the augmenter system. Similarly, the pigtails require a significant amount of time for removal and replacement should a fuel injection point malfunction. Therefore, an augmenter fuel injection mounting system is required which eliminates the need for the pigtail tubes.

SUMMARY OF THE INVENTION

It is an object of this invention, therefore, to provide a mounting system for an augmenter fuel injector which permits accurately controlled and uniformly distributed fuel injection to both the fan and core engine flow paths without the use of pigtail fuel distribution tubes. It is a further object of this invention to provide such a mounting system which permits quick and easy replacement of individual fuel injectors.

Briefly stated, the above and similarly related objects are attained by providing a gas turbine engine augmenter fuel injection system in which fuel injectors are mounted in thermal expansion accommodating fittings, which support the injectors axially but permit radial thermal expansion between the exhaust duct and the fuel injector/manifold assembly. Each fuel injector is provided with a metering valve housing, which carries a flow metering valve and which mounts directly to a fuel manifold surrounding the exhaust duct. Vibration damping is incorporated into each injector mount fitting such that coulomb damping is provided by a tight fitting bushing and both gas sealing and viscoelastic damping is provided by a heat resistant elastomer seal. The fuel manifold may include separate piping for the core engine and fan flow paths. In addition, provisions are made for mounting twin fuel injectors at each separate metering valve housing mounting point which permits one set of metering valves to service two fuel injection stations.

DESCRIPTION OF THE DRAWINGS

While the specification concludes with a series of claims which particularly point out and distinctly claim the subject matter which Applicant regards to be his invention, the invention will be clearly understood from the following detailed description, which is given in connection with the accompanying drawings, in which:

FIG. 1 is a schematic, longitudinal section of a gas turbine engine embodying the present invention;

FIG. 2 is an enlarged, fragmentary, longitudinal section of a portion of FIG. 1;

FIG. 3 is a top plan view, taken generally along line 3—3, of FIG. 2;

FIG. 4 is a sectional view, similar to FIG. 2, taken generally along line 4—4 of FIG. 3;

FIG. 5 is an enlarged, cross-sectional view of the flexible seal, with the fuel injector tube removed for clarity;

FIG. 6 is a partial, sectional view taken along line 6-6 of FIG. 3;

FIG. 7 is a partial, sectional view of an alternative manifold mounting system;

FIG. 8 is an enlarged, fragmentary, longitudinal section of an alternative embodiment;

FIG. 9 is a top plan view taken generally along line 9—9 of FIG. 8;

FIG. 10 is an enlarged, fragmentary, longitudinal section of another alternative embodiment; and FIG. 11 is a top plan view taken generally along line 11—11 of FIG. 10.

DESCRIPTION OF A PREFERRED EMBODIMENT

Referring now to the drawings wherein like numerals correspond to like elements throughout, attention is directed initially to FIG. 1 wherein a gas turbine engine 10 is shown schematically in order to properly set the motivating environment for Applicant's invention. The gas turbine engine 10 is of the turbofan type and includes a core engine 12 which includes a fan turbine 14 which drives a plurality of fan blades 16 mounted on a shaft 15. The fan blades 16 are located within an inlet 17 formed by an outer or fan casing 18 which surrounds the entire gas turbine engine 10. The fan casing 18 cooperates with a core engine casing 20 to define parallel flow paths 22 and 23.

Air entering the flow path 23 is compressed by means of a compressor 24 and is mixed with fuel in combustor 26. Fuel is delivered to the combustor 26 by means of a plurality of fuel injection points 27 from fuel tubes 28 which extend through the flow path 22. The resultant high energy gas exits the combustor 26 and drives a turbine 30 which, in turn, drives the compressor 24.

As further shown in FIG. 1, air flowing through the outer or fan flow path 22 and air exiting the core engine 12 is acted upon by an augmenter 32, which consists of a plurality of core engine fuel injectors 34 and a plurality of fan injectors 36. The resultant fuel/air mixture in the augmenter 32 is ignited by means of a suitable igniter (not shown) and thereafter provides an additional propulsive force by exiting through an exhaust nozzle 38.

The gas turbine engine 10 described above is typical of many present day augmented turbofan engines and has been described solely to place the present invention in proper perspective. As will be clear to those skilled in the art, the present invention will be applicable to other types of gas turbine engines and, therefore, the engine 10 is merely meant to be illustrative.

Referring now to FIGS. 2 through 4, the gas turbine engine augmenter 32 is shown in greater detail. As shown therein, each of the core engine injectors 34 includes a spraybar bundle which consists of a plurality of tubes or spraybars 40, 42 and 44 adapted to spray fuel into the core engine exhaust passageway, which is generally designated by the numeral 46. For this reason, one or more holes 48 are spaced along the length of the tubes 40, 42 and 44. As is known in the art, the tubes are partially surrounded by a fairing 50 which provides a generally airfoil-shaped contour to the injector 34 and acts to reduce aerodynamic losses which might otherwise be associated with the injector 34.

Similarly, referring to FIG. 4, the fan injectors 36 include a spraybar bundle consisting of a plurality of tubes or spraybars 52, 54 and 56 each of which is provided with a plurality of holes 58 for injecting fuel into the fan flow path 22. The injector 36 is also partially surrounded by a fairing 60 to reduce aerodynamic losses. As will be apparent from a comparison of the core injector 34 with the fan injector 36, the primary difference between the two lies in the fact that the fan injector 36 is angled such that it extends upstream when installed within the fan flow path 22. In contrast with this, the core injectors 34 lie in a single radial plane. The fan injectors 36 are angled as shown in order to provide greater dwell time for fuel injected from the holes 58 prior to the time of its ignition downstream. This is necessary because of the relatively low temperatures associated with the air flowing through the fan flow path 22 as opposed to the higher temperatures of the air flowing through the core engine exhaust 46. These higher temperatures are sufficient to vaporize the flow from the holes 48 in a relatively short distance.

The core injectors 34 and the fan injectors 36 alternate around the circumference of the gas turbine engine 10. That is, a single core injector 34 is positioned between each pair of the fan injectors 36, and the injectors 34 and 36 are substantially equally spaced around the circumference of the engine 10.

As further shown in FIGS. 2 and 4, the core injectors 34 and the fan injectors 36 extend through openings 62 provided in the fan casing 18. In order to prevent the escape of hot gas from the fan flow path 22, each of the openings 62 is provided with a seal and damper assembly 64, the details of which are shown in the enlarged sectional view of FIG. 5. As shown therein, the seal and damper assembly 64 consists of a metal collar 66, which surrounds and captures therein a bushing 68 and a seal 70. The collar 66 is mounted directly to the casing 18 in any suitable manner, such as by means of bolts which extend through bolt holes 72.

As shown in FIGS. 2 and 4, a slightly enlarged boss 74 associated with both the core injectors 34 and the fan injectors 36 fits within, and is free to slide radially with respect to, the bushing 68 and the seal 70. The bushing 68 and the collar 66 provide both coulomb damping and axial support for the injectors 34 and 36 and support them effectively as simple beams. The seal 70 fits tightly enough around the boss 74 to prevent leakage of air from the engine and to provide viscoelastic damping in the event of vibration excitation of the fuel system. The fit is, however, not tight enough to restrict the relative thermal expansion of the casing 18 and the injectors 34 and 36. When applied to a turbofan engine as shown in FIG. 1, the bushing 68 and the seal 70 are subjected to relatively low fan air temperatures and may therefore be made of elastomeric or polymeric materials for lightweight, low cost and minimum leakage operation. Metal bushing and seals of the ring type could be used to apply this same type of fuel injection system to higher temperature applications, such as straight turbojets.

In order to precisely control the amount of fuel delivered by the core injectors 34 and the fan injectors 36, each core injector is supplied with a metering valve housing for a metering valve 76 and each fan injector is supplied with a metering valve housing for a metering valve 77, the internal details of which valves form no part of the present invention. Suffice it to say that the valves 76 and 77 accurately control the amount of fuel delivered to each of the different tubes associated with the injectors 34 and 36. For example, each of the valves 76 and 77 initially acts to supply lightoff fuel to the spraybar tubes 44 and 56 and thereafter to supply sufficient fuel to their respective spraybar tubes 40 and 57 to accomplish primary operation of the augmenter 32. When higher thrust output is desired from the augmenter 32, the metering valves 76 and 77 act to deliver additional fuel to the tubes 42 and 54.

As shown in FIGS. 2 through 4, each of the injectors 34 and 36 is rigidly bolted to a continuous ring-type manifold 78 which includes a fan fuel pipe 80, a core fuel pipe 82, and a plurality of injector connection pads 84. A gasket 86 of conventional type is used at the joint between each of the connection pads 84 and an injector mounting pad 88 associated with each of the housings for metering valves 76 and 77. The mounting pads 88 are rigidly connected to the connection pads 84 by means of a plurality of bolts 90 and nuts 92.

The joint formed by the connection pads 84 and the mounting pads 88 serves as the hydraulic connection between the injectors 34 and 36 and the fuel manifold 78. In addition, this joint serves to support the injector radially. It is this feature which permits the elimination of the conventional pigtail connection discussed in the introduction above. Since the injectors 34 and 36 are supported radially only by the manifold 78, as opposed to the conventional rigid duct mounting, no flexible pigtail connections are needed to accommodate the relative thermal expansion between the manifold 78 and the fan casing 18 and the seal and damper assembly 64 which is bolted thereto. That is, the injectors 34 and 36 are fixed radially by the manifold 78 and axially by the seal and damper assembly 64, while being free to slide radially within the seal and damper assembly 64 to accommodate any thermal growth differences. The elimination of the pigtail-type injector connection not only improves the augmenter envelope but also reduces the weight and improves maintainability. That is, as should be readily apparent, each of the injectors 34 and 36 may be replaced solely by disconnecting the bolts and nuts 90 and 92, removing the used injector 34 or 36, sliding in a replacement injector, and replacing the bolts and nuts 90 and 92.

Fuel is delivered to the fuel manifold 78 by means of a fan fuel inlet 94 and a core fuel inlet 96. That is, fan fuel is delivered to the pipe 80 by means of the inlet 94 and core fuel is delivered to the pipe 82 by means of the inlet 96. Fuel is delivered to the core injectors 34 from the pipe 82 through a plurality of connecting tubes 98, one of which extends from the pipe 82 to each of the core injectors 34. Each of the tubes 98 has a passage 99 therethrough which acts to deliver fuel from the pipe 82 to the metering valve 76, which controls the amount delivered to the injector 34. Likewise, fan connecting tubes 100 lie between the fuel pipe 80 and each of the fan injectors 36 and act to deliver fuel via a passageway 101 to the metering valve 77, which controls the amount delivered to the injector 36.

The fuel manifold 78, and its associated pipes 80 and 82, may be mounted to the engine casing 18 in any suitable manner. For example, as shown in FIG. 6, the pipes 80 and 82 may be mounted to the casing 18 by means of pivotal links 102 a first end of which is mounted for pivotal movement to a pivot trunnion 104, which is in turn bolted to the fan casing 18. The opposite end of the link 102 is pivotally mounted to saddle 106 which is brazed or connected to the pipe 80 in any suitable manner. The links 102 are spaced around the circumference of the casing 18 as required. The pipe 82 could be mounted directly to the casing 18 by using similar links or could be mounted directly to the pipe 80.

In many applications, the pivotal links 102 may not be necessary and the pipes 80 and 82 could be mounted directly to the engine casing 18 as shown in FIG. 7. In this case, the pipe 80 is brazed or welded directly to a saddle 108 which bolts to the casing 18. The pipe 82 is then mounted directly to the pipe 80 by means of a plurality of mounting blocks 110, which may also serve as the mounting pads for the injectors 34 and 36. In such a case, the block 110 would include a pad face 111 having a plurality of holes 112 therein to mate with similar holes in the mounting pad 88 of the injectors 34 and 36. Passageways 114 would then extend from the pipe 82 to each of the core injectors 34, while similar passageways (not shown) would extend between the pipe 80 and each of the fan injectors 36.

An alternative embodiment of the inventive augmenter fuel injector is shown in FIGS. 8 and 9. The injector assembly shown therein is similar to that described above and utilizes a fuel manifold mounting system as shown in FIG. 7. The primary difference between the systems lies in the fact that a core injector 116 is provided with five spraybar tubes 118, 120, 122, 124 and 126. The tubes 118 and 120 are auxiliary fan spraybar tubes which extend only through the length of the fan duct flow path 22 and terminate at a boss 128 which fits within an opening 130 formed in the core casing 20. The tubes 122, 124 and 126 extend into the core engine exhaust passage 46 and perform identical functions to those of the tubes 40, 42 and 44 shown in FIGS. 2 and 3. That is, the tube 126 delivers a lightoff spray while the tubes 122 and 124 deliver primary and secondary augmenter fuel to the core exhaust stream.

The tubes 118 and 120 are utilized to provide more uniform distribution of augmenter fuel in the fan flow path 22 by doubling the number of fuel injector points located within the flow path 22. In order to provide a simple and reliable system while eliminating the need for additional costly flow metering valves, the system shown in FIGS. 8 and 9 uses each of the metering valves 77 associated with each of the fan injectors 36 to control the amount of fuel delivered to not only the fan injectors 36 but also to the auxiliary fan spraybar tubes 118 and 120. For this reason, and as shown most clearly in FIG. 9, the fuel injector system is provided with a plurality of U-shaped tubes 132, which interconnect each adjoining pair of mounting blocks 110. A passageway 133 is formed within an enlarged boss portion 134 of the fan injectors 36 to provide a portion of the fuel delivered by the fan metering valves 77 directly to the auxiliary fan tubes 118 and 120 of the core injector 116 via a passage 135 drilled in a boss 136 of each of the core injectors 34. Thus, when fan duct burning is desired, an operating signal actuates a fuel control which delivers fuel to the fan pipe 80. The fan injector metering valves 77 then operate to deliver the desired amount of fuel from the pipe 80 to the fan injectors 36. A portion of this fuel exits the fan metering valve 77 via the passage 133 and is bypassed via the tubes 132 and passage 135 to the auxiliary injector tubes 118 and 120 of the core injector 116. Thus, the total amount of fan fuel flow is metered by the same number of metering valves 77 but the number of injection points is double because the tubes 118 and 120 also act as fan injectors. As an example, if the gas turbine engine 10 is equipped with 28 fan fuel injectors 36 and 28 core fuel injectors 116, the fan duct burning can be accomplished utilizing all 56 injectors whereas the core duct burning will be accomplished using only the 28 core injectors.

Referring now to FIGS. 10 and 11, another alternative embodiment of the inventive augmenter injector assembly is shown wherein twin injectors are provided with a single set of metering valves to service two injection stations. In this manner, the overall cost and weight of the injector assembly may be reduced. As shown in FIGS. 10 and 11, the injector assembly consists of twin spraybar bundles 140 and 142, a manifold connection flange 144, and support bosses 146 and 148. The injector assembly is rigidly bolted to a continuous ring-type manifold 150, which consists of fan and core fuel pipes 152 and 154, respectively, and a plurality of injector connection pads 156. A gasket 158 of conventional design is used between each of the injector connection pads 156 and the manifold connection flanges 144. As in the previous case, this joint provides the hydraulic connection between the spraybar bundles 140 and 142 and the fuel manifold fan and core pipes 152 and 154.

In addition, this joint serves to support the injector assembly in the radial direction. Since the injectors are supported radially only by the manifold 150 as opposed to the conventional rigid duct mounting, no flexible pigtail connections are needed to accommodate the relative thermal expansion of the manifold 150 and the fan casing 18 as their respective temperatures vary during engine operation. Thermal expansion is accommodated by allowing the injectors to move radially with respect to the fan casing 18 and the seal and damper assembly 64 which is mounted directly to the casing 18 by means of the bolts 160. The injector bosses 146 and 148 are free to slide radially with respect to the bushing 68 and the seal 70 of the seal and damper assembly 64. Once again, the bushing 68 and the collar 66 provide axial support for the spraybar bundles 140 and 142.

As further shown in FIG. 11, each of the injector assemblies has associated therewith a fan metering valve 162 and a core metering valve 164. In contrast with the systems described above, in connection with FIGS. 1 - 9, each of the spraybar bundles 140 and 142 has associated therewith one or more fan injector tubes 166 and one or more core injector tubes 168. The fan injector tubes 166 and the core injector tubes 168 extend parallel to each other to form the spraybar bundles 140 and 142. The fan injector tubes 166 extend only through the width of the fan flow path 22 and terminate at a boss 170 which fits within an opening 172 formed within the core engine duct 20.

In operation, fuel is supplied by the manifold 150, and in particular by the fan and core fuel pipes 152 and 154, respectively, to the fan metering valve 162 and the core metering valve 164, respectively. The fan metering valve 162 controls the exact amount of fuel which is delivered to the fan injector tubes 166, while the core metering valve 164 controls the amount of fuel delivered to the core injector tubes 168. The fuel injected into the fan flow path 22 or the core exhaust flow path 46 is then ignited by means of suitable igniters (not shown) and the resultant high energy gas stream exits through a propulsive nozzle to provide added thrust to the gas turbine engine.

As described above in connection with a number of preferred embodiments, Applicant has provided a unique augmenter fuel injection system which has a number of basic advantages. For example, the mounting system eliminates the need for pigtail-type injector connections and thereby improves the envelope of the injection system. A significant reduction in weight is also associated with the elimination of the pigtail-type connection. Furthermore, maintainability of the gas turbine engine is significantly improved in that each of the individual fuel injectors or, in the embodiment of FIGS. 10 and 11, each pair of fuel injectors is readily removable by merely disconnecting a pair of bolts associated with the injector connection pads. A new injector may then be positioned within the seal and damper assembly and the bolted connection simply remade. While a number of preferred embodiments have been described, those skilled in the art will realize that certain changes in these embodiments may be made without departing from the broader inventive concepts taught by Applicant. It is intended, therefore, that the appended claims cover all such modifications and variations which fall within the broader inventive concepts.

What I claim is:

1. In a gas turbine engine of the type including a casing which defines an exhaust duct which has an augmenter combustion system located therein and has a fuel manifold assembly surrounding said duct, the improvement comprising:

a fuel injection spraybar assembly consisting of a metering valve housing, at least one spraybar tube extending from said housing radially inwardly through said duct, said tube having a fuel passage therethrough and means for spraying fuel therefrom, valve means located within said housing for metering fuel delivered to said spraybar tube, and said valve housing including a mounting pad adapted to be connected directly to the fuel manifold assembly and to support said spraybar assembly along a first axis substantially perpendicular to the casing, said mounting pad being offset from a plane in which said spraybar tube lies so as to permit removal of said spraybar tube from said fuel manifold assembly without the necessity of moving the fuel manifold assembly.

2. The spraybar assembly recited in claim 1 further characterized in that a plurality of spraybar tubes extend from said valve housing and said valve housing includes an enlarged boss portion through which said spraybar tubes extend.

3. The spraybar assembly recited in claim 2 further characterized in that said mounting pad provides the hydraulic connection between said spraybar assembly and the fuel manifold assembly.

4. The spraybar assembly recited in claim 3 in combination with a seal and damper assembly which surrounds said enlarged boss portion, said seal and damper assembly supporting said spraybar assembly in a direction substantially perpendicular to said first axis while permitting relative motion between said spraybar assembly and said seal and damper assembly along said first axis.

5. The combination recited in claim 4 wherein said seal and damper assembly includes a metal collar adapted to mount to the engine casing, said collar having an opening therethrough adapted to receive said enlarged boss portion of said spraybar assembly.

6. The combination recited in claim 5 further characterized in that said metal collar includes means for providing friction damping of said spraybar assembly, said friction damping means being sized so as to permit relative thermal expansion of said spraybar assembly and said collar.

7. The combination recited in claim 6 wherein said metal collar further includes means for providing a gas seal between said enlarged boss portion and the engine casing, said sealing means also providing viscoelastic damping of said spraybar assembly.

8. In a gas turbine engine of the type which includes an engine casing defining an annular flow path, a compressor, a combustion system, a turbine for driving the compressor, an exhaust system, and an augmenter combustion system for increasing the energy level of the exhaust gas flow prior to its exiting through the exhaust system, the improvement comprising:
a fuel distribution system for the augmenter including a fuel manifold, a plurality of metering valve housings, valve means located within said housing for metering fuel delivered to said spraybar tube, and each of said housings including a mounting pad adapted to be connected directly to said fuel manifold, each said valve housing having associated therewith at least one spraybar tube bundle adapted to extend through said engine casing into the exhaust gas flow path and to deliver fuel thereto, characterized in that said mounting pad acts as the hydraulic fluid connection between said fuel manifold and said spraybar tube bundle and said fuel manifold supports said spraybar assembly in the radial direction, said mounting pad being offset from a plane in which said spraybar tube lies so as to permit removal of said spraybar tube from said fuel manifold assembly without the necessity of moving the fuel manifold assembly.

9. The improved fuel distribution system recited in claim 8 wherein each spraybar bundle includes an enlarged boss section adapted to fit within an opening in the engine casing and said fuel distribution system further includes a seal and damper assembly associated with each spraybar bundle, said seal and damper assembly surrounding said boss portion and supporting said spraybar bundle in the axial direction.

10. The improved fuel distribution system recited in claim 9 wherein said seal and damper assembly includes a collar adapted to be connected directly to the engine casing and said collar includes a gas seal for minimizing the flow of fluid between said collar and said spraybar bundle.

11. The improved fuel distribution system recited in claim 10 wherein said collar also includes bushing means for friction damping the fuel distribution system in the event of vibration excitation of said system.

12. The improved fuel distribution system recited in claim 11 wherein said friction damping is provided by an elastomeric bushing which surrounds said boss portion of said spraybar bundle, and said gas seal provides viscoelastic damping in the event of vibration excitation of said system.

13. The improved fuel distribution system recited in claim 12 wherein said fuel manifold includes separate fan and core fuel pipes and means for connecting a first plurality of said metering valve housings to said fan fuel pipe and the remaining metering valve housings to said core fuel pipe.

14. The improved fuel distribution system recited in claim 12 further characterized in that each of said metering valve housings has associated therewith at least two of said spraybar bundles and each said metering valve housing provides fuel from said fan fuel pipe to fan spraybar tubes associated with each said bundle and fuel from said core fuel pipe to core spraybar tubes associated with each said bundle.

15. A gas turbine engine including a casing defining a flow path, a compressor, a primary combustion system, a turbine for driving said compressor, an exhaust nozzle, and an augmenter combustion system, said augmenter system including a fuel distribution system which includes a fuel manifold, a plurality of metering valve housings, valve means located within said housing for metering fuel delivered to said spraybar tube, and each of said housings including a mounting pad adapted to be connected directly to said fuel manifold, each said valve housing having associated therewith at least one spraybar tube bundle adapted to extend through said engine casing into the exhaust gas flow path and to deliver fuel thereto, characterized in that said mounting pad acts as the hydraulic fluid connection between said fuel manifold and said spraybar tube bundle and said fuel manifold supports said spraybar assembly in the radial direction, said mounting pad being offset from a plane in which said spraybar tube lies so as to permit removal of said spraybar tube from said fuel manifold assembly without the necessity of moving the fuel manifold assembly, each said spraybar bundle including an enlarged boss section adapted to fit within an opening in said casing, and a seal and damper assembly associated with each said spraybar bundle, said seal and damper assembly including means for mounting said assembly to said casing, means for supporting said bundle in the axial direction, and means for damping vibration of said bundle.

* * * * *